May 5, 1953　　　　M. E. WILKE　　　　2,637,757
DEFERRED ACTION BATTERY
Filed Sept. 5, 1951
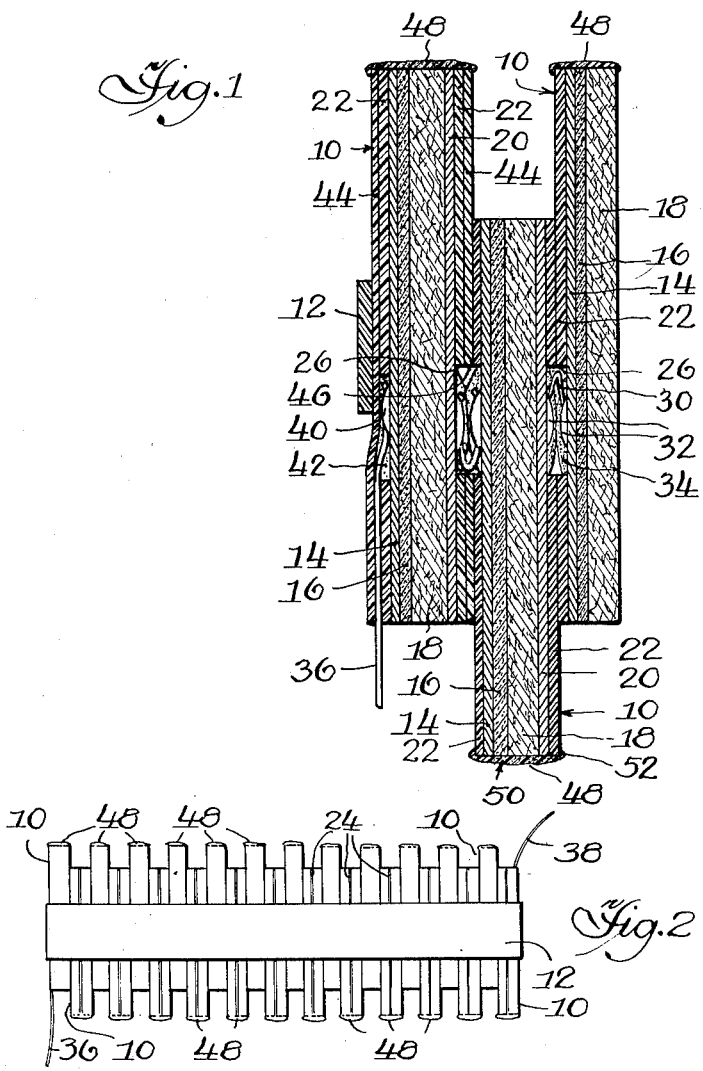
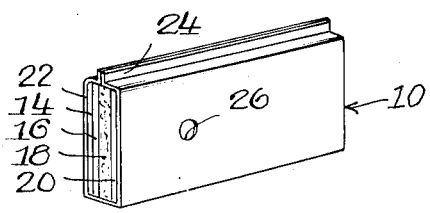
Inventor,
Milton E. Wilke,
By: Jones, Iesch & Darbo
Attys.

Patented May 5, 1953

2,637,757

UNITED STATES PATENT OFFICE 2,637,757

DEFERRED ACTION BATTERY

Milton E. Wilke, Freeport, Ill., assignor to Burgess Battery Company, Freeport, Ill., a corporation of Delaware Application September 5, 1951, Serial No. 245,142

5 Claims. (Cl. 136—112)

This invention relates to primary batteries and particularly to improvements in a multiple cell deferred action primary battery in which the cells are of the flat type. More especially it relates to batteries of the character described which are adapted to be activated by being brought into contact with a body of activating liquid, as by being dipped or immersed in a body of the activating liquid.

In deferred action batteries of the general character described, each cell is composed of a pair of dissimilar electrodes with an electrolyte-receptive element between the electrodes, and the cell elements have one or more surfaces exposed to the surrounding space in such manner that all of the cells may be activated simultaneously by contact with a common body of activating liquid. The activating liquid is absorbed by the electrolyte-receptive elements, and the difficulty has been encountered that some of the activating liquid clings to the exposed surfaces of the cell elements and forms bridges between the elements of different cells, particularly between the positive electrode of one cell and the negative electrode of the adjacent cell. As a consequence, an electrolytic action takes place between such electrodes resulting in a consumption of the negative electrode. Also, short circuits occur between the cells and the net result is that the voltage and capacity of the batteries are reduced and the energy is dissipated.

In the copending application of Joseph J. Coleman and Milton E. Wilke, Serial No. 207,722, filed January 25, 1951, a multiple cell deferred action battery is described and claimed in which the cells are of the flat type and are each composed of a sandwich-like arrangement of flat elements laterally enclosed by an impervious non-conductive covering which is open at the ends of the cell whereby the ends of the cell elements are exposed to the surrounding space, the cells are arranged parallel to one another and each cell is displaced endwise with respect to the cell adjacent thereto, the endwise displacement of each succeeding cell being in a direction opposite to that of the last cell whereby the open ends of the cells are spaced apart and separated by a substantial portion of the wall of the impervious covering. Such separation serves to lengthen the bridges of electrolyte to the extent that the difficulties referred to above are largely overcome.

The present invention relates to a battery of a character generally similar to that of the said copending application in which the ends of the cells which project beyond the ends of the adjacent cells are sealed with an adherent sealing composition. It has been found that the dissipation of energy caused by electrolyte bridges between the positive and negative electrodes of adjacent cells is much less with such construction. Such bridges are, in effect, prevented. The construction of the present invention is especially advantageous where the battery is to be operated continuously immersed in activating liquid.

It is, therefore, the principal object of the invention to provide a multiple cell deferred action battery of the character described in which the formation of bridges of activating liquid between cells is, in effect, prevented.

Other objects and advantages will become apparent as the following description progresses, which is to be taken in conjunction with the accompanying drawing, in which Fig. 1 is a sectional elevation on an enlarged scale of a portion of an embodiment of the battery of the invention;

Fig. 2 is a side elevation of said embodiment, and

Fig. 3 is a perspective view of a cell of the battery of Figs. 1 and 2.

The battery shown in Figs. 1 and 2 is composed of a plurality of series-connected flat cells 10 arranged in face-to-face juxtaposed relation, each cell being offset endwise thereof with respect to the cells adjacent thereto and the assembly of cells being held together under pressure by the encircling band or tape 12 or other suitable means.

Each cell is composed of a plurality of juxtaposed thin flat cell elements arranged in sandwich-like relationship. The elements comprise, proceeding from left to right in Fig. 1, the positive electrode 14, the depolarizing body 16, the absorbent electrolyte-receptive element 18 and the negative electrode 20. By way of illustration and not of limitation, in a specific embodiment of the cell, the positive electrode 14 may be composed of silver, the depolarizing body 16 of silver chloride, the electrolyte-receptive element 18 of absorbent paper such as blotting paper, and the negative electrode 20 of magnesium. The positive and negative electrodes 14 and 20 form the facing surfaces of the assembly of elements and the electrolyte-receptive element 18 is located between the electrodes.

The assembly of flat elements forming each of the cells 10 is enclosed laterally, that is, upon all of the sides except the two opposite ends, by a non-conductive covering or wrapper 22 which may be composed of a suitable substantially electrolyte - impervious, non - conductive material, such as rubber hydrochloride, a form of which is commercially available under the trade-mark "Pliofilm," the copolymer of vinyl acetate and vinyl chloride, polymerized ethylene, paper impregnated with resin, varnish, etc., or a similar suitable material.

As shown in Fig. 3, the wrapper 22 is formed by encircling the assembly of cell elements laterally with a sheet of the wrapper material and turning the edge portions 24 of the sheet outwardly and uniting said edge portions by an adhesive, or in the case of the rubber hydrochloride and polymerized ethylene products, by heat-sealing said portions together. The wrapper is preferably cemented by an adhesive to one or both of the facing electrodes 14 and 20, thereby forming a firm, compact cell which is open at the ends exposing the end surfaces of the cell elements. At each such end, the cell elements and the wrapper 22 are preferably caused to terminate in substantially the same plane. The resulting cell has two broad sides and two narrow sides encased by the wrapper 22 and two open ends which are exposed to the surrounding space. The broad sides of the wrapper 22 are substantially coextensive with the facing surfaces of the positive and negative electrodes, respectively. In each of the broad sides of the wrapper 22 there is provided an opening 26 exposing the facing surfaces of the positive and negative electrodes respectively, said openings being preferably nearer to one end of the cell than to the other as shown for reasons which will be explained hereinafter.

In assembling the battery of series-connected cells, the cells are arranged in parallel relationship in a stack with the broad sides thereof in face-to-face juxtaposed relationship and with their open ends directed toward the same two opposite sides of the battery. In the embodiment illustrated, the ends of the cells are smaller in size than any of the other sides and the longest dimension of the cell is that extending from one end to the other, and the axis extending in that direction is considered the longitudinal axis of the cell. The invention is not limited, however, to cells of such shape and the length does not need to be greater than the width or thickness and the open ends may have a size equal to or larger than any or all of the other sides of the cells. Preferably, the cells of a battery are of substantially the same length.

Each succeeding cell in the stack comprising the battery is offset endwise with respect to the cells adjacent thereto, the offset of each succeeding cell being in a direction opposite to that of the last to form a staggered succession of cells in which each succeeding cell projects endwise in the opposite direction from the last. The cells are all oriented similarly, that is, as the battery is viewed in Fig. 1, the positive electrodes 14 are all at the left side of the cells. With the cells all of uniform construction as shown in Fig. 3 and having the openings 26 nearer to one end than the other, alternate cells are rotated edgewise through 180° with respect to intermediate cells and arranged with the openings 26 of adjacent cells substantially in registration with each other along a line substantially coinciding with the longitudinal axis of the battery.

The positive electrode 14 of one cell is thereby exposed to the negative electrode 20 of the adjacent cell through the openings 26, and said adjacent electrodes are connected together by a wire conductor 30 which is connected by the solder 32 to the positive electrode 14 and negative electrode 20 of the two adjacent cells and passes through the openings 26. The soldered connections and preferably the entire area of the electrodes 14 and 20 which are exposed in the openings 26 are covered with a suitable non-conductive sealing composition 34, such as lacquer or varnish. A sufficient number of cells are stacked together to provide the desired voltage at the terminals of the battery. In the embodiment illustrated, the assembled battery has a length greater than its other dimensions and its longitudinal axis is perpendicular to the longitudinal axes of the cells 10.

As shown in Fig. 1, the cell 10 at the left end of the battery has end terminal 36 connected to the portion of positive electrode 14 thereof which is exposed at the opening 26 of the wrapper 22, said connection being by means of the solder 40. The solder 40 and preferably the surface of the electrode and wire 36 which is exposed in the openings 26 are covered and sealed by the non-conductive body 42 of lacquer or varnish. An extra wrapper 44 generally similar to wrapper 22 covers the lateral surfaces of said end cell and leaves the ends of the cell open and exposed. Wrapper 44 provides a covering for the connection between terminal 36 and the cell. Said wrapper 44 has an opening 46 therein registering with opening 26 in wrapper 22 between the end cell and the adjacent cell to accommodate the connection 30. At the other end of the battery the arrangement with respect to the connection of terminal 38 to the end cell and the provision of an extra wrapper for said end cell are the same as has been described in the foregoing. The assembled battery is held under compression by the encircling tape 12 or other suitable means.

The assembled battery comprises a stack of flat cells in which each succeeding cell is offset endwise in the opposite direction from the last, providing a staggered succession of cells in which the alternate cells each has an end projecting toward one side of the battery and the intermediate cells each has an end projecting toward the opposite side of the battery. Preferably the projecting ends of the cells on each said side of the battery lie in the same plane as shown in Figs. 1 and 2.

In accordance with the present invention, the projecting ends of the cells on each said side of the battery have closures 48 of an adherent non-conductive sealing composition which form a complete liquid-impervious covering and seal for the end surfaces of the cell elements and the projecting end of each cell. The seal closures 48 are formed by applying the sealing composition in viscous liquid condition to the ends of the cells. This is very conveniently done by dipping one side of the battery, as the side shown at the bottom in Fig. 2, into a body of the viscous composition, removing it from the body and then dipping the opposite side of the battery into the body of viscous composition and removing it from the body. After each dipping operation, the sealing composition clings to the dipped ends of the cells, and it is allowed to solidify in the atmosphere to form the sealing caps or closures 48.

The sealing composition may be a heat-fusible substance such as wax or pitch, such as is customarily used for dry cell seals. In such case the cell ends are dipped in a bath of the molten composition and removed and the adhering composition is allowed to cool and solidify. The sealing composition may also be applied in the form of a viscous solution, such as a solution of solid polyisobutylene, polystyrene or cellulose acetate in a suitable solvent such as carbon tetrachloride, or cellulose nitrate dissolved in acetone. In such solutions, 25 parts by weight of the compound and 75 parts of the solvent provides a satisfactory viscous solution. The cell ends are dipped in the solution, removed and the solvent allowed to evaporate to form an adherent, solid, liquid-impervious seal closure.

The dipping is controlled so that the projecting end portions of the cells are submerged a sufficiently short distance that the non-projecting or recessed ends of the cells do not touch the body of sealing composition. A sufficient quantity of the sealing composition adheres to the end surfaces of the cell elements and the wrappers 22 to form a complete and impervious sealing closure for each projecting cell end. The composition also clings to the outside surface of the wrapper 22 adjacent to the end of the cell, which is an important advantage in providing a complete seal closure. As is illustrated in Fig. 1, the sealing composition forms a cap over the end of each cell which has a top portion 50 covering the end surfaces of the cell elements and a skirt portion 52 extending down over the exterior marginal surface of the wrapper 22. Such cap completely seals the end of the cell from the surrounding space. At the same time, the recessed end of each cell does not have any sealing composition applied to it and is entirely open and exposed to the surrounding space. For the practical manufacturing of a battery of this construction, the projecting cell ends should extend at least approximately ⅛ inch beyond the ends of the other cells so that contact of the non-projecting cell ends with the body of sealing composition may be avoided, and they should be dipped in the liquid sealing composition to a depth of at least approximately $\frac{1}{32}$ inch to form satisfactory seals.

The battery is initially manufactured in the electrolyte-free condition and may be stored indefinitely without undergoing any deterioration or exhaustion. When it is desired to place the battery in operation, an activating liquid is introduced into the cells, which liquid may be of any suitable composition. By way of illustration and not of limitation, in the embodiment specifically described the activating liquid may be plain water such as tap water or a dilute salt solution such as a solution of sodium chloride. Sea water is a very satisfactory activating liquid and the battery is especially well adapted for use at sea. The activating liquid may be introduced in any suitable manner as by applying a suitable quantity to the open end of each cell, but it is preferably introduced by dipping or immersing the battery in a body of the activating liquid. The liquid is absorbed by the electrolyte-receptive elements 18 and said elements are thereby moistened with the liquid and the battery is rendered operative.

It has been found that although each of the cells has an end which is entirely open so that the end surfaces of the cell elements are directly exposed to the surrounding space, the formation of electrolyte bridges between the negative electrode of one cell and the positive electrode of the adjacent cell is in effect prevented in the construction of the present invention and there is substantially no dissipation of energy by reason of the short circuits and non-productive electrolytic action normally caused by such electrolyte bridges.

While only a single embodiment of the invention has been described and illustrated, the invention is not limited thereto and modifications may be made as will occur to those skilled in the art. As has been stated heretofore, the character or composition of the cells may be different from that described and any desired character of cell may be used, for example, the conventional LeClanche cell having zinc and carbon electrodes, a manganese dioxide depolarizer and an electrolyte composed of an aqueous solution of ammonium chloride and zinc chloride.

What is claimed is:

1. A primary battery adapted for energization by contact with a body of activating liquid, comprising a plurality of electrically connected flat cells, each cell comprising a plurality of flat cell elements including an electrolyte-receptive element, a substantially electrolyte-impervious non-conducting covering enclosing each said cell upon the four sides thereof and leaving the two opposite ends thereof unenclosed by said covering, said cells being generally parallel to each other and in face-to-face juxtaposed relationship and the ends of said cells being disposed toward the same two opposite sides of said battery, each cell being offset endwise thereof with respect to the cell adjacent thereto, the offset of each succeeding cell being in a direction opposite to that of the last cell to form a staggered succession of cells in which each succeeding cell projects endwise in the opposite direction from the last, closures upon the projecting ends of said cells of an adherent sealing composition, and the ends of said cells opposite the projecting ends thereof being open to the surrounding space for contacting a body of activating liquid.

2. A primary battery adapted for energization by contact with a body of activating liquid, comprising a plurality of electrically connected flat cells, each cell comprising a plurality of flat cell elements including an electrolyte-receptive element, a substantially electrolyte-impervious non-conductive covering enclosing each said cell upon the four sides thereof and leaving the two opposite ends thereof unenclosed by said covering, said cells being generally parallel to each other and in face-to-face juxtaposed relationship and the ends of said cells being disposed toward the same two opposite sides of said battery, each cell being offset endwise thereof with respect to the cell adjacent thereto, the offset of each succeeding cell being in a direction opposite to that of the last cell to form a staggered succession of cells in which each succeeding cell projects endwise in the opposite direction from the last, the projecting ends of said cells on the same side of said battery being substantially in the same plane, seal closures upon the projecting ends of said cells of an adherent sealing composition, and the ends of said cells opposite the projecting ends thereof being open to the surrounding space for contacting a body of activating liquid.

3. A primary battery adapted for energization by contact with a body of activating liquid, comprising a plurality of electrically connected flat cells, each cell comprising a plurality of flat cell elements including an electrolyte-receptive element, a substantially electrolyte-impervious non-conductive covering enclosing each said cell upon the four sides thereof and leaving the two opposite ends thereof unenclosed by said covering, said cells being generally parallel to each other and in face-to-face juxtaposed relationship and the ends of said cells being disposed toward the same two opposite sides of said battery, each cell being offset endwise thereof with respect to the cell adjacent thereto, the offset of each succeeding cell being in a direction opposite to that of the last cell to form a staggered succession of cells in which each succeeding cell projects endwise in the opposite direction from the last, closures upon the projecting ends of said cells of an adherent sealing composition, and the ends of said cells opposite the projecting ends thereof being open to the surrounding space for contacting a body of activating liquid, said seal closure for each cell being in the form of a cap of the sealing composition having a top portion covering the end surfaces of the cell elements and the covering and a skirt portion covering the exterior marginal surface of the covering at said extending end of the cell.

4. A primary battery adapted for energization by contact with a body of activating liquid, comprising a plurality of electrically connected flat cells each cell comprising a sandwich-like arrangement of flat cell elements including an electrolyte-receptive element and two electrodes, said electrodes forming respectively the opposite flat faces of the cell, a substantially electrolyte-impervious non-conductive covering substantially coextensive with said flat faces and extending around a perimeter of said cell and leaving the two opposite ends of said cell unenclosed by said covering, said end surfaces being the composite of the end surfaces of said cell elements and of said covering, said cells being generally parallel to each other and in face-to-face juxtaposed relationship and the ends of said cells being disposed toward the same two opposite sides of said battery, each cell being offset endwise thereof with respect to the cell adjacent thereto, the offset of each succeeding cell being in a direction opposite to that of the last cell to form a staggered succession of cells in which each succeeding cell projects endwise in the opposite direction from the last, seal closures upon the projecting ends of said cells of an adherent sealing composition, and the ends of said cells opposite the projecting ends thereof being open to the surrounding space for contacting a body of activating liquid.

5. A primary battery adapted for energization by contact with a body of activating liquid, comprising a plurality of series-connected flat cells, each cell comprising a sandwich-like arrangement of flat cell elements including a pair of dissimilar electrodes forming the flat faces of said cell and an electrolyte-receptive element between said electrodes, a substantially electrolyte-impervious non-conductive covering extending around a perimeter of each said cell and leaving the two opposite ends of said cell unenclosed by said covering, the edges of said cell elements and said covering terminating substantially in a flat plane at said cell ends, said cells being generally parallel to each other and in face-to-face juxtaposed relationship and the ends of said cells being disposed toward the same two opposite sides of said battery, in each pair of adjacent cells an electrode of one cell being adjacent to the dissimilar electrode of the other cell, each cell being offset endwise thereof with respect to the cell adjacent thereto, the offset of each succeeding cell being in a direction opposite to that of the last cell to form a staggered succession of cells in which each succeeding cell projects endwise in the opposite direction from the last, seal closures upon the projecting ends of said cells of an adherent sealing composition, and the ends of said cells opposite the projecting ends thereof being open to the surrounding space for contacting a body of activating liquid.

MILTON E. WILKE.

References Cited in the file of this patent

UNITED STATES PATENTS

| Number | Name | Date |
|---|---|---|
| 2,519,527 | Wilkinson | Aug. 22, 1950 |
| 2,564,495 | Mullen | Aug. 14, 1951 |

FOREIGN PATENTS

| Number | Country | Date |
|---|---|---|
| 248,942 | Great Britain | Mar. 18, 1926 |
| 513,744 | France | Feb. 22, 1921 |